United States Patent [19]

Ng

[11] Patent Number: 5,623,608
[45] Date of Patent: Apr. 22, 1997

[54] METHOD AND APPARATUS FOR ADAPTIVE CIRCULAR PREDICTIVE BUFFER MANAGEMENT

[75] Inventor: Spencer W.-F. Ng, San Jose, Calif.

[73] Assignee: International Business Machines Corporation, Armonk, N.Y.

[21] Appl. No.: 338,919

[22] Filed: Nov. 14, 1994

[51] Int. Cl.⁶ .................................................. G06F 13/00
[52] U.S. Cl. .................... 395/250; 364/239.8; 364/939.7
[58] Field of Search .................................... 395/775, 375, 395/800, 250

[56] References Cited

U.S. PATENT DOCUMENTS

| | | | |
|---|---|---|---|
| 4,377,852 | 3/1983 | Thompson | 395/250 |
| 4,442,488 | 4/1984 | Hall | 395/452 |
| 4,926,323 | 5/1990 | Baron | 395/375 |
| 5,003,471 | 3/1991 | Gibson | 395/250 |
| 5,123,099 | 6/1992 | Shibata et al. | 395/425 |
| 5,235,551 | 8/1993 | Sinofsky | 365/230.01 |
| 5,255,136 | 10/1993 | Machado et al. | 360/77.02 |
| 5,285,527 | 2/1994 | Crick et al. | 395/425 |
| 5,469,558 | 11/1995 | Lieberman | 395/285 |

FOREIGN PATENT DOCUMENTS

| | | | |
|---|---|---|---|
| 0301211 | 2/1989 | European Pat. Off. | G06F 12/08 |
| 0517473A2 | 12/1992 | European Pat. Off. | G11B 10/12 |
| WO-A-93 24886 | 12/1993 | WIPO | G06F 12/08 |

*Primary Examiner*—David Y. Eng
*Attorney, Agent, or Firm*—Baker, Maxham, Jester & Meador

[57] ABSTRACT

A system for adaptively managing predictive buffer memory prefetching operations to optimize buffer memory hits in a data storage system. The arriving data access request (DAR) stream is monitored for a particular data access pattern and, when a sequential access pattern (SAP) is detected, the buffer memory prefetching storage rule is switched to a circular overwrite mode (COM) to achieve the best sequential access performance. When the sequential access pattern disappears, a nonsequential access pattern (NAP) is detected and the buffer memory prefetching storage rule is responsively switched to a non-sequential or block overwrite mode (BOM) to maximize data block "re-use" hits in the data buffer. Sequential access pattern detection is achieved using a threshold that may be adapted to the size of incoming DARs. The buffer memory may be organized in many smaller segments, each operated independently according to the system of this invention, to provide simultaneous optimal predictive buffering for multiple processing threads.

19 Claims, 3 Drawing Sheets

METHOD AND APPARATUS FOR ADAPTIVE CIRCULAR PREDICTIVE BUFFER MANAGEMENT

BACKGROUND OF THE INVENTION

1. Field of the Invention

This invention relates generally to data store buffer systems and specifically to a direct access store buffer memory that adapts to changes in data store access patterns to optimize predictive buffer hit rates.

2. Discussion of the Related Art

In most computer systems, the processor operates on data received from some data store, such as a Direct Access Storage Device (DASD), an optical disk drive, or the like. The processor operates at high speed relative to the usual data store, which motivates the computer system designer to include all available means for increasing data store speed to reduce processor waiting time. Waiting time can be reduced by using high-speed (expensive) data store technology such as high-speed Random Access Memory (RAM) as an intermediate cache or buffer memory between data store and processor. Waiting time may also be reduced by anticipating the data to be requested and "prefetching" them to the buffer memory from the data store before arrival of a data request from the processor.

Most DASDs and optical disk drives are equipped with a RAM buffer memory or "look-ahead buffer" partitioned into many segments. Each segment is used for look-ahead prefetching of data blocks from the data storage medium. A DASD or optical disk drive buffer memory provides "read" prefetching of data by continuing to read subsequent consecutive data sectors into the buffer memory in anticipation of possible future use after completing the initial read request received from the processor. This prefetching strategy is additional to any segment selection strategy based on Least Recently Used (LRU) or other replacement procedures.

The usual predictive buffer memory management technique saves all or the last portion of the currently requested data in an active buffer memory segment and continues to prefetch subsequent data sectors into the remainder of the active segment in consecutive order. This can be accomplished efficiently in mechanically-operated data stores because the two fetch and prefetch operations require only a single mechanical read-head disk access. Thus, for any single Data Access Request (DAR), the data store first fetches the requested data blocks and stores at least the last portion thereof in a buffer memory segment. After completion of the fetch operation, the data store continues to read in consecutive order sufficient additional subsequent data blocks to fill the active buffer memory segment. The prefetching step ends either when the active buffer memory segment is completely filled or when the next DAR arrives (if the next DAR is not a buffer hit). If the next DAR is a buffer "hit", the requested data is retrieved from the buffer memory segment and prefetching may continue uninterrupted because no new data store access is necessary. If the next DAR is not a buffer hit (i.e., is a buffer "miss"), a new data store fetching access is initiated for a new buffer segment and the requested data blocks are returned to the newly active buffer segment, leaving undisturbed the fetched and prefetched data blocks in the formerly active buffer segment for possible future hits. The newly active buffer memory segment is selected from among many such segments by using some sort of LRU selection procedure or the like.

This predictive buffer memory management scheme is quite efficient if the data access pattern provides reasonable likelihood that the data block requested in the current DAR will soon be again requested (a "repeated" access). Such a "re-use" buffer memory hit is efficient because no new data store access is necessary. An example of such a repeated Nonsequential Access Pattern (NAP) to several Logical Block Addresses (LBAs) is "read LBA5, read LBA8, read LBA700, read LBA5". The first DAR (read LBA5) results in a data store access to fetch LBA5, which is then stored in a first buffer memory segment. After fetching LBA5, the subsequent LBAs 6–36 are consecutively prefetched and stored in the same first buffer memory segment (presuming a segment capacity of 32 LBAs). When the second DAR (LBA8) arrives, the requested data is retrieved directly from the first buffer memory segment, having been prefetched. When the third DAR arrives (read LBA700), a second data store access is initiated to fetch LBA700, which is then stored in a second buffer memory segment together with the 31 consecutive subsequent LBAs 701–731. Finally, when the fourth DAR arrives (read LBA5), the data is retrieved directly from the first buffer memory segment, which has not yet been disturbed. As more DARs arrive, the first buffer segment is soon overwritten in response to LRU selection for one of the new DARs. Thus, unless data block requests are frequently repeated, this predictive buffer memory management scheme contributes little to overall data store efficiency.

A predictive buffer strategy is often preferred because (a) it requires no more than the data store accesses otherwise required for the "fetched" data to retrieve the next few data blocks in consecutive order from the data store medium and (b) the DAR access pattern is often "sequential", consisting of a series of DARs for data blocks stored consecutively in the data store medium. An example of a Sequential Access Pattern (SAP) is "read LBA100, read LBA101, read LBA102, . . . " and so forth for many DARs. Assuming that each buffer memory segment has a 32-block capacity, the above-described predictive buffer memory management scheme first fetches LBA100 into a first buffer memory segment and then prefetches LBA101–131 into the same first buffer memory segment, thereby filling it to capacity and halting the prefetching activity, ending the one necessary data store access operation. Advantageously, the next 31 DARs (read 101, read 102, . . . , read 131) hit in the first buffer memory segment. A problem occurs when the 33rd DAR (read LBA132) arrives. Because this DAR misses the buffer memory, a second data store access operation is initiated to fetch LBA132 (and to prefetch LBA133–163) into a second buffer memory segment. This second data store access operation requires substantial time (in terms of processor speed) and slows data store performance because of an unavoidable "hiccup" in buffer memory hits at every 33rd DAR in long sequential data access patterns.

The above-described predictive management strategy is optimal for Nonsequential Access Patterns (NAPs) but can be revised to improve efficiency for DARs arriving in Sequential Access Patterns (SAPs) through the use of a "circular" predictive buffer management scheme. The circular buffer memory management scheme monitors the active buffer memory segment for a read hit anywhere in the segment. When the hit is detected, all logical buffer memory segment space preceding the hit data block is immediately released for use in storing additional prefetched data blocks without activating a new buffer segment. This can be understood by considering each buffer memory segment to be a "wrap-around" segment wherein all space ahead of the hits is immediately filled with subsequent data blocks prefetched from the data store medium. When the physical end of the buffer memory segment is encountered, it is logically wrapped around to join the physical beginning, giving rise to the denomination "circular buffer". This circular buffer memory management scheme is optimal for SAPs because sequential prefetching of data blocks can continue in one uninterrupted disk access so long as new DARs arrive requesting data blocks in consecutive sequence, thereby eliminating the hiccup problem. Consecutive data blocks may be continuously prefetched into the buffer memory segment so long as incoming DARs continue to request sequential data blocks, but Nonsequential (repeated) Access Patterns (NAPs) are not efficiently handled because each buffer data block is immediately overwritten instead of remaining in memory to provide a hit for a repeated access request. Accordingly, there is a clearly-felt need in the art for a predictive buffer memory management scheme that optimally supports both sequential access patterns (SAPs) and nonsequential (repeated) access patterns (NAPs) in a data store system. The circular management scheme known in the art uses a Circular Overwrite Mode (COM) as discussed above. The predictive segment scheme known in the art uses a Block Overwrite Mode (BOM) as discussed above. The COM is inconsistent with the BOM in a segmented buffer memory even though a BOM memory approaches a single-segment COM buffer as it is reconfigured into ever-larger numbers of ever-smaller segments if a Least Recently Used (LRU) segment allocation procedure is employed.

Practitioners in the art have proposed adjusting the segment or block size in a BOM buffer memory intended to operate with NAPs. For instance, in U.S. Patent No. 5,285,527, William R. Crick et al. disclose a predictive historical cache memory system with circular buffer characteristics for use as a part historical, part predictive cache memory for processor instruction execution. Crick et al. provide the usual circular memory management capability for efficient retrieval of sequential instructions because processor instructions are typically retrieved and executed sequentially. Because instruction flow is often interrupted by conditional and unconditional branch instructions, they also provide means for disabling the block prefetching operation upon detection of such an interruption in sequential flow. Crick et al. continuously compare the location of the last instruction executed and the last instruction prefetched, disabling the prefetching operation whenever the two instruction addresses diverge by predetermined amount. While this method avoids unnecessary loss of historical buffer memory elements, Crick et al. neither consider nor suggest modified prefetching of instructions when the access pattern diverges.

Similarly, in U.S. Patent No. 5,003,471, Gibson discloses an intermediate data buffer with a sliding "windowed programmable data buffer (WPDB)" that operates as a programmable circular data buffer that can be adjusted in size and location within the buffer memory. Gibson's WPDB may be programmed to increment forward around the buffer memory or remain stationary and may operate in either of two modes: one mode using offsets to access data within the window and another using offsets to access the window itself, permitting prefetching and storage of data through a First-In-First-Out (FIFO) buffer. Gibson's windowing scheme is directed primarily to a cache management scheme that permits the use of short address segments by the processor and he neither considers nor suggests means for optimizing buffer management responsive to access patterns.

In U.S. Patent No. 4,377,852, Thompson discloses a communications control system that includes means for the interrupt-control of a circular buffer in a text scrolling control system. Thompson proposes operator-controlled switching of circular buffer operation from "wrap-on" to "wrap-off" modes, both of which operate intelligently to preserve the textual display characteristics of data columns as originally received. Thompson neither considers nor suggests methods for adaptively managing his buffer memory responsive to data access patterns. Similarly, in European Patent Application No. 0 517 473 A2, Bruce R. Peterson et al. disclose a programmable data sequencer for transferring fixed-length data blocks between variable-length storage locations and a buffer memory within a data store system. Peterson et al. consider the problem of automatic data block sequencing in a Zone-Band Recording (ZBR) disk storage scheme where data block characteristics vary by location within the data store medium. They neither consider nor suggest means for adaptive buffer memory management responsive to changes in data access patterns, limiting their concern to processor-controlled variable-length data blocking.

Accordingly, there remains a clearly-felt need in the art for a technique suitable for automatically adapting buffer memory operation to changes in incoming data access patterns, including a suitable method for detecting changes in such patterns. These unresolved deficiencies are clearly felt in the art and are solved by this invention in the manner described below.

SUMMARY OF THE INVENTION

The method of this invention exploits both circular and non-circular buffer management techniques by using an adaptive scheme that dynamically adjusts the buffer management rules responsive to the access pattern of the incoming DARs. The method of this invention also establishes an access pattern detection standard that for the first time distinguishes between a Sequential Access Pattern (SAP) wherein the incoming DARs specify data blocks in consecutive storage order, and a Nonsequential Access Pattern (NAP) wherein the incoming DARs do not specify data blocks in consecutive storage order. Individual buffer memory segments are independently switched between Circular Overwrite Mode (COM) and Block Overwrite Mode (BOM) responsive to detection of SAP or NAP, respectfully. An incoming DAR is considered to be "sequential" if the requested data block medium storage address is contiguous to the medium storage address of the immediately previous requested data block.

It is an object of this invention to provide a buffer memory management scheme that optimizes buffer memory hits for data access patterns that vary unpredictably between repeated and sequential access patterns. It is a feature of the method of this invention that incoming DARs are counted to determine the number of consecutive sequential DARs, which number is then compared to a threshold to find a SAP. It is another feature of this invention that buffer memory management is switched to circular overwrite mode (COM) whenever a SAP is detected. It is an advantage of the method of this invention that switching between circular and non-circular buffer memory management rules responsive to the presence or absence of a SAP substantially improves the number of buffer memory hits for varying data access patterns.

It is another object of the method of this invention to adapt its advantages to a multitasking processing environment, wherein the incoming data store access requests switch among a plurality of processing threads. It is a feature of this invention that each segment in a segmented buffer memory can be independently operated according to the method of this invention to provide the adaptive segment management method of this invention for each of a plurality of independent processing threads. It is another feature of this invention that each segment in a segmented buffer memory can be operated to permit a minimum amount of prefetching to complete before termination responsive to detection of a SAP.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DESCRIPTION OF THE PREFERRED EMBODIMENTS

Figures 1, 2:
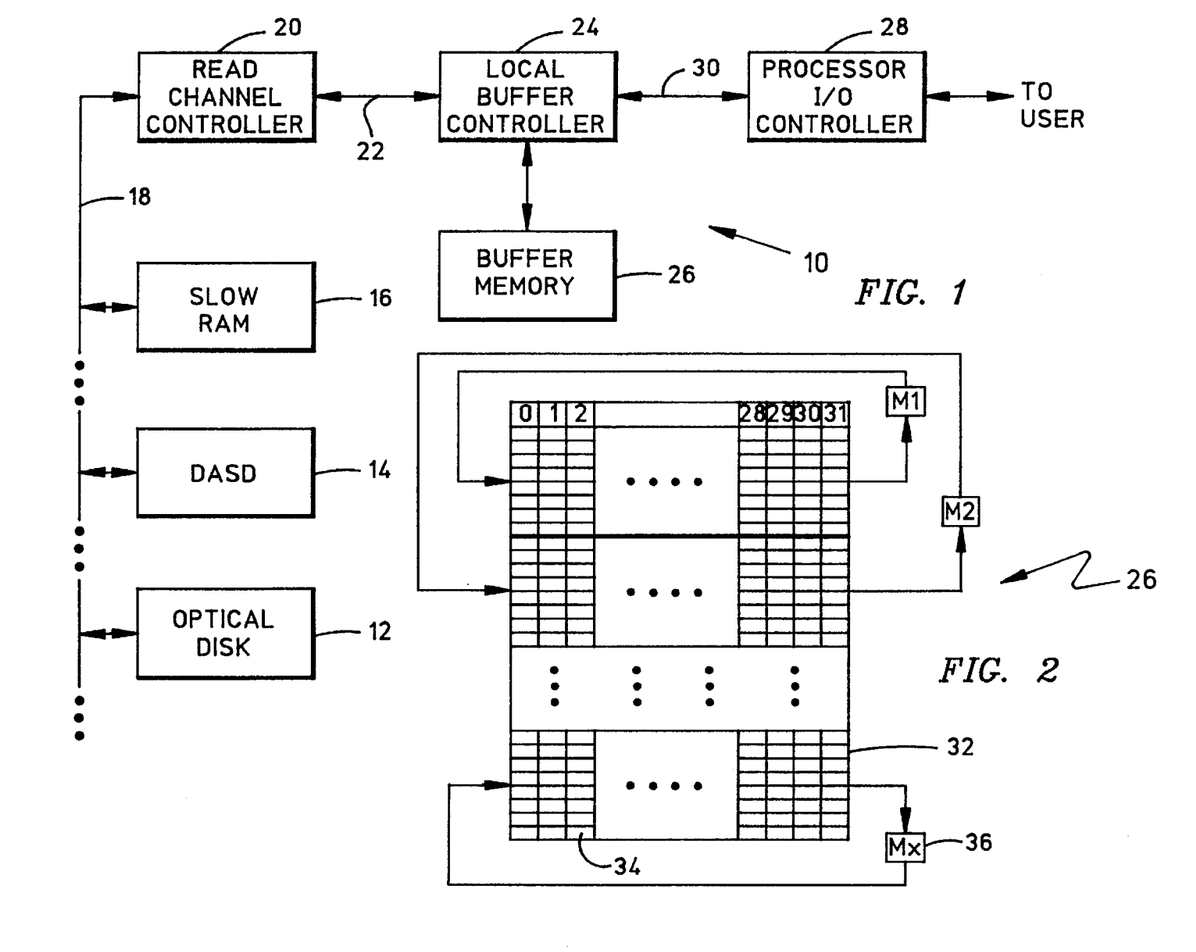
FIG. 1 shows a functional block diagram of a typical data store apparatus including the buffer memory controller of this invention.
FIG. 2 shows a functional block diagram of a typical multi-segment buffer memory suitable for use with the method of this invention.

FIG. 1 provides a simple functional block diagram of a data store system 10 suitable for application of the method of this invention. Data store system 10 includes a primary storage means exemplified by an optical disk 12 or a DASD 14 or perhaps a relatively slow RAM 16. The exact embodiment of the primary storage means is unimportant to the practice of this invention. Data is stored in primary storage means 12, 14 or 16 as data blocks in a sequence. That is, stored data blocks are logically ordered in some fashion such as according to physical location in the storage medium.

When data blocks are retrieved from the primary storage means, they are passed on bus 18 to a read channel controller 20. Read channel controller 20 performs the necessary decoding and data signal conversions required to produce the requested data blocks at bus 22. A local buffer memory controller 24 passes the data blocks from bus 22 to a buffer memory 26, which may be configured as a "write-through" memory, although not shown as such in FIG. 1. An external processor input/output (I/O) controller 28 issues data access requests (DARs) on the I/O bus 30 and receives data blocks from controller 24 on bus 30 in response to the same DARs.

Buffer memory 26 may be organized as a single segment or as a plurality of independently-controlled memory segments, such as shown in FIG. 2. FIG. 2 shows buffer memory 26 organized as a plurality of memory segments exemplified by the memory segment 32. Each segment provides for contiguous storage of 32 data blocks, exemplified by the block2 data block 34 in segment 32. As is well-known, data block 34 includes a (perhaps substantial) multiplicity of data bytes. Each data block in memory segment 32 is addressable, usually by means of a "last-address" pointer (not shown) that moves from block to block, beginning with block0 and transiting to block31. When operated in a Block Overwrite Mode (BOM), a requested data block is stored at the beginning of segment 32 (block0) and subsequent prefetched data blocks are written in consecutive order through the end of segment 32 (block31). This is herein denominated BOM operation because selection of segment 32 for fetch and prefetch operations results in overwriting all positions within segment 32. When operating in circular overwrite mode (COM), the prefetching operation wraps around from block31 to block0 and continues in circular fashion indefinitely through segment 32, always writing a new prefetched block just ahead of the "last-address" pointer in the fashion known in the art for circular buffer operation.

In FIG. 2, buffer memory 26 of this invention includes a mode switch M for each segment, exemplified by the Mx switch 36 coupled to segment 32. When segment 32 is operated in COM, mode switch 36 couples block31 to block0 substantially as shown. When segment 32 is operated in BOM, mode switch 36 interrupts this wrap-around coupling. Each segment in buffer memory 26 operates substantially as discussed for segment 32. Of course, memory 26 may be configured as a single segment if desired.

The method of this invention controls the operation of the mode switches exemplified by mode switch 36 using an adaptive scheme that detects and responds to the access pattern of the incoming DARs. This method can be understood to include two elements: (a) detection of the incoming DAR access pattern and (b) switching the appropriate buffer memory segment mode accordingly. The decision to switch between COM and BOM is based on detecting the presence or absence of a sequential access pattern (SAP). The absence of a SAP is herein denominated a nonsequential access pattern (NAP).

An incoming DAR is herein denominated as sequential if its starting address is contiguous to the last address of the previous DAR. A SAP is detected when the number of consecutive sequential DARs rises to exceed a predetermined threshold and the appropriate buffer segment mode is then switched from BOM to COM responsive to the detection. An important element of this invention is the affirmative mode switching back to BOM responsive to detection of a NAP, which occurs whenever the number of consecutive sequential DARs falls below a predetermined threshold.

Figures 3, 3A:
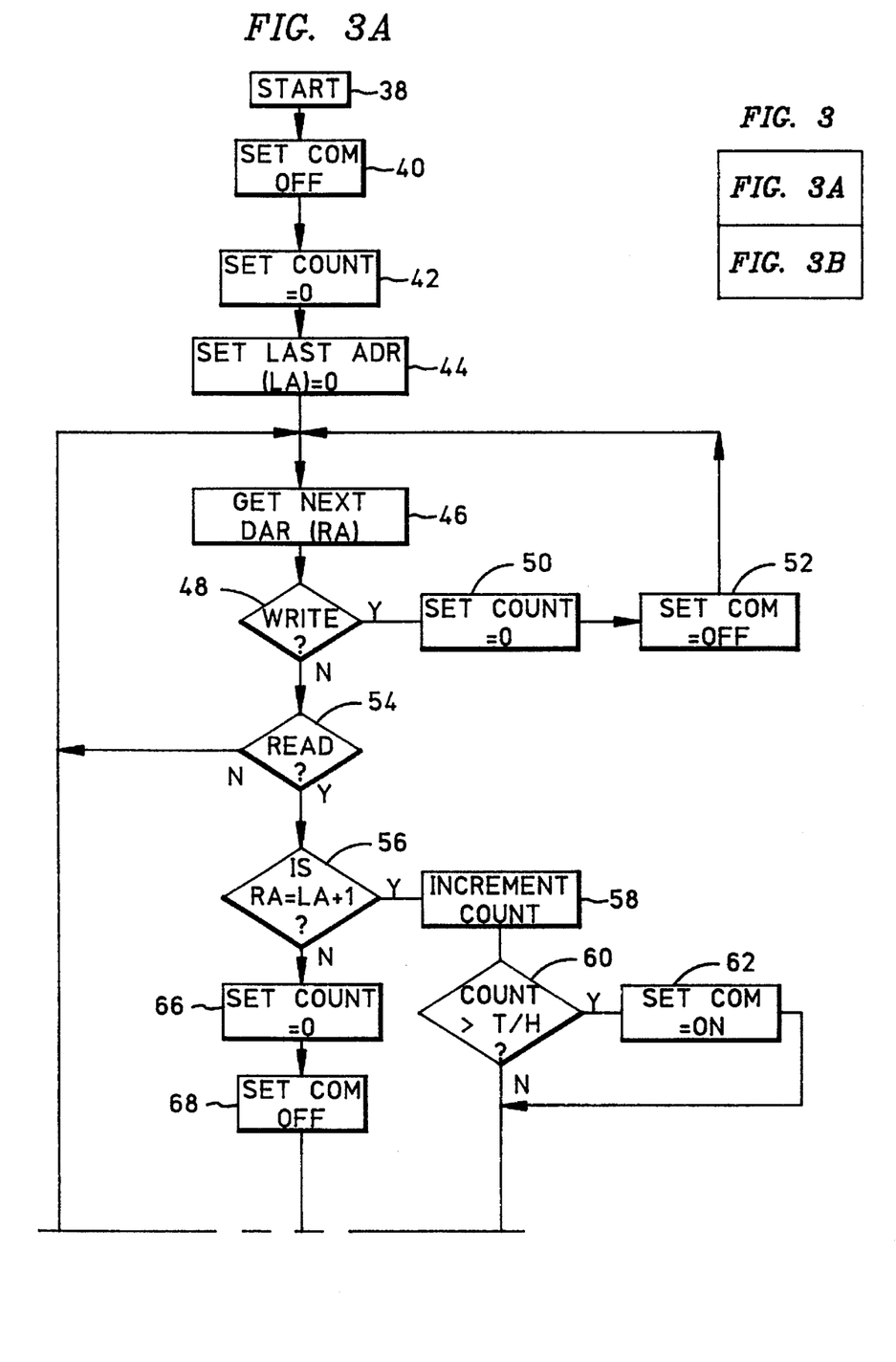
FIG. 3 shows the relationship between FIGS. 3A and 3B.
FIGS. 3A–3B show a functional block diagram of a flow chart of a first exemplary embodiment of the method of this invention.
Figure 3B:
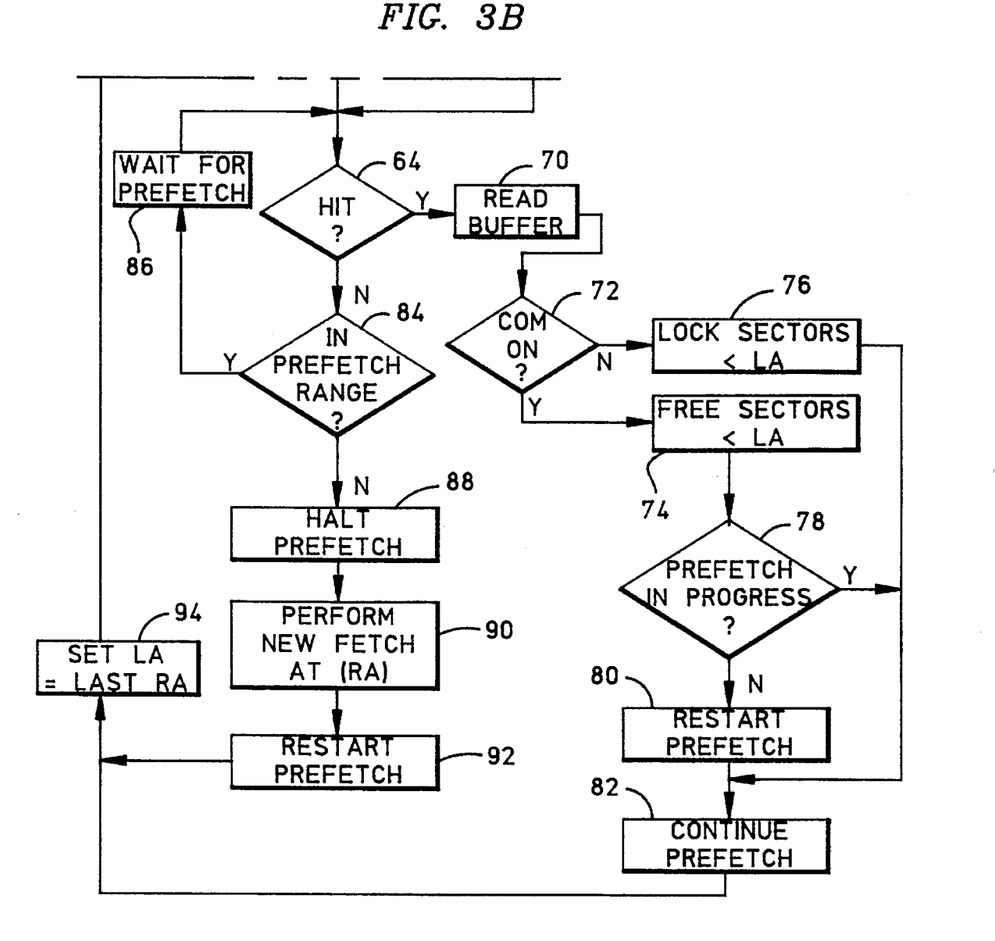

The method of this invention may be appreciated with reference to Table 1 and FIG. 3. FIG. 3, comprising FIGS. 3A–3B, provides a simple functional block diagram of a flow chart representation of the pseudocode implementation shown in Table 1 for a single-segment buffer memory embodiment.

TABLE 1

```
START:
    circular_buf_mgt = OFF;
    sequential_count = 0;
    last_address = 0;
LOOP:
    get next command;
    if (command == WRITE) {
        sequential_count = 0;
        circular_buf_mgt = OFF;
```

TABLE 1-continued

```
}
if (command == READ) {
    if (request_address == (last_address + 1)) {
        sequential_count = sequential_count + 1;
        if (sequential_count > threshold) {
            circular_buf_mgt = ON;
        }
    }
    else {
        sequential_count = 0;
        circular_buf_mgt = OFF;
    }
    if (request is buffer hit) {
        read from buffer;
        if (circular_buf_mgt is ON) {
            free up preceding sectors in hit segment;
            if (prefetch is not in progress) {
                restart prefetch;
            }
        }
        if (circular_buf_mgt is OFF) {
            do not free up preceding sectors in hit segment;
        }
        if (prefetch is in progress) {
            continue to prefetch;
        }
    }
    if (request is not yet in buffer but within prefetch range) {
        wait for data to be read from disk, then transfer to host;
        if (circular_buf_mgt is ON) {
            free up preceding sectors in hit segment;
        }
        if (circular_buf_mgt is OFF) {
            do not free up preceding sectors in hit segment;
        }
        continue to prefetch;
    }
    if (request is buffer miss) {
        unconditionally stop any ongoing prefetch;
        go do disk access;
        start new look ahead prefetch after request is done;
    }
    last_address = LBA of last sector requested;
}
goto LOOP
```

In FIG. 3A, the process is started at step 38, whereupon the mode switch is set to BOM at step 40. The "COUNT" of consecutive sequential data block accesses is set to zero at step 42, meaning that there are no consecutive sequential data block accesses. Finally, the initialization is completed at step 44 by setting the last address (LA) to zero.

The process then starts the main loop by accepting the next DAR in step 46. The DAR includes a "request address" (RA) that specifies the desired data block. If the DAR is a "write" request, step 48 resets the COUNT to zero at step 50 and resets the mode to BOM at step 52 before returning to step 46 for the next DAR. If the DAR is not a "write" request, step 54 then tests it for a "read" request. If neither writing nor reading, step 54 returns to step 46 for the next DAR. If the DAR is a "read" request, step 56 then tests the latest DAR to determine whether or not it is "consecutive" in sequence with respect to the immediately previous DAR by checking the request address (RA) against last address (LA) for incrementation (RA=LA+1).

If the latest DAR is consecutive in sequence, COUNT is incremented at step 58 and tested against a predetermined threshold at step 60. If COUNT is greater than or equal to the threshold, then the mode is switched to COM at step 62 and the procedure advances to step 64 in FIG. 3B to determine whether the requested data block exists in buffer memory. If step 56 finds that the latest DAR is not consecutive in sequence, then COUNT is reset to zero at step 66, the mode is set to BOM at step 68 and the process advances to step 64 in FIG. 3B.

In FIG. 3B, if step 64 finds that the requested data block in buffer memory, it is immediately produced at step 70 without the usual delay required to access the primary storage means. After reading the buffer at step 70, step 72 tests for COM and either releases the buffer memory sectors behind LA at step 74 or locks those sectors at step 76 responsive to BOM.

After releasing sectors in step 74, then step 78 checks to see if a prefetching media access is in progress. If not, step 80 initiates a new fetching access to the storage medium. Step 82 continues any prefetching access already in progress and then proceeds to step 94 discussed below. Step 76 proceeds immediately to step 82.

If the DAR finds the requested data block is not in buffer memory (a "miss"), step 84 tests to determine whether the requested data block is in prefetching range; that is, whether the requested data block is expected to arrive in buffer memory as a result of the prefetching access in progress. If the requested data block is within prefetch range, step 86 waits for completion of the present prefetching access and returns to step 64 for the expected buffer memory hit. If not within prefetch range, step 88 immediately halts the present prefetching access to permit step 90 to initiate the necessary new fetching access to the RA. After completion of the RA fetch, step 92 continues the medium access with initiation of prefetching access and step 94 resets the LA to the new last RA before returning to step 46 in FIG. 3A to accept the next DAR.

The inventor has tested the effect on efficiency of the adaptive circular buffer management process of this invention disclosed above in connection with FIG. 3 for a particular DASD by using a standard benchmark computer program. The results of these tests are summarized in Table 2 below.

TABLE 2

| Disk Throughout Tests | Without Invention | | With Invention | | |
|---|---|---|---|---|---|
| | Elapsed Time | Throughput | Elapsed Time | Throughput | Improvement |
| IM/200 Sequential Read | 6246 msec | 480.31 KB/s | 5116 msec | 586.40 KB/s | +22% |
| IM/512 Sequential Read | 5831 msec | 631.11 KB/s | 4687 msec | 785.15 KB/s | +24% |
| IM/2K Sequential Read | 5291 msec | 1129.09 KB/s | 3577 msec | 1670.11 KB/s | +48% |
| IM/4K Sequential Read | 10938 msec | 1097.46 KB/s | 6248 msec | 1921.25 KB/s | +75% |

As shown in Table 2, the simple single-segment buffer memory implementation of the method of this invention obtains performance improvements of from 22% to 75% over the prior art.

In a multitasking environment (e.g., OS/2) or a multiuser environment (e.g., a file server), even though a task may be issuing sequential DARs, the DARs may be mingled with those of other tasks or users resulting in an apparently nonsequential DAR stream at the data store system. For example, if task A issues a request to read blocks A1, A2 and A3; task B issues requests to read blocks B1, B2 and B3; and these are interleaved, the DASD may receive a DAR stream requesting blocks A1, B1, A2, B2, A3 and B3, which clearly does not exhibit a SAP. Such an interleaved DAR stream creates two problems. First, the arrival of read-B1 preempts the prefetch of the A block sequence, leading to future buffer misses; the arrival of read A2 similarly preempts the prefetch of the B block sequence, again resulting in future buffer misses; and so forth. This leads to an undesirable data store threshing environment. Secondly, the buffer memory can never enter the circular overwrite mode (COM) because SAPs are never detected in such a DAR stream.

The single-segment embodiment of the process of this invention can be extended to handle workload environments in which multiple streams of DARs are submitted to a single data store system in an interlaced fashion such that a sequential DAR stream from one user does not appear to the data store system to be consecutively sequential. This environment can be accommodated by using the buffer memory architecture described above in connection with FIG. 2 where a separate sequential counter (COUNT) is maintained for each buffer segment exemplified by segment 32 in FIG. 2. The embodiment discussed above in connection with Table 1 and FIG. 3 is improved by incrementing the individual sequential counter associated with the single buffer memory segment in which there is a hit for which the incoming RA is contiguous to the LA associated with that particular memory segment. With these two improvements, each buffer memory segment may individually switch between COM and BOM, depending on whether the associated DAR pattern is a SAP or a NAP.

The preferred embodiment of the method of this invention resolves this problem by operating a multiplicity of buffer memory segments independently, each according to the method of this invention discussed above in connection with Table 1. Each segment is preferably associated with only one different process or user. For instance, if block A1 is assigned to segment 1 and block B1 is assigned to segment 2, then references to the A block sequence can be associated with segment 1 and references to the B block sequence associated with segment 2. Because the process of this invention requires each segment to maintain its own sequential counter (COUNT) and its own value for the LA requested in the associated DAR, the remainder of the process operates substantially as discussed above in connection with FIG. 3. Table 3 below provides a pseudocode embodiment of the preferred method of this invention suitable for interleaved sequential DAR streams.

TABLE 3

```
START:
  for (every segment j) {
    sequential_flag(j) = OFF;
    sequential_count(j) = 0
    last_address(j) = 0;
  }
LOOP:
  get next command;
  if (command == READ) {
    k = segment number associated with this READ;
    if (request_address == (last_address(k) + 1)) {
      sequential_count(k) = sequential_count(k) + 1;
      if (sequential_count(k) > threshold) { /* the threshold can be a function of the
                 request size */
        sequential_flag(k) = ON
      }
    }
    else {
      sequential_count(k) = 0;
      sequential_flag(k) = OFF;
    }
    if (request is buffer hit) {
      read from segment_k;
      if (sequential_flag(k) is ON) {
        free up preceding sectors in segment_k;
        allow minimal prefetch;
        if (prefetch is not in progress) {
          restart prefetch; /* this is optional */
        }
      }
      if (prefetch is in progress) {
        continue to prefetch;
      }
    }
    if (request is not yet in buffer but within prefetch range)
      wait for data to be read from disk, then transfer to host;
      if (sequential_flag(k) is ON) {
        free up preceding sectors in segment_k;
        allow minimal prefetch;
      }
      continue to prefetch;
    }
    if (request is buffer miss) {
      stop ongoing prefetch after satisfying any request minimal prefetch;
```

TABLE 3-continued

```
        go do disk access;
        start new look ahead prefetch after request is done;
        do not allow minimal prefetch;
    }
    last_address(k) = LBA of last sector requested;
    }
goto LOOP;
```

An important element of the method of this invention is the "minimum prefetch" requirement imposed on the data store system as new DARs are received. The usual practice in the art is to preempt the prefetch in progress immediately upon receipt of a new DAR. This invention provides the capacity to complete some minimum prefetch before such preemption.

Accordingly, in the embodiment shown in Table 3 above, once a memory segment detects a SAP in its associated DAR stream, it not only switches to circular overwrite mode (COM) but also bars preemption of ongoing prefetching until after some minimum number of sectors have been prefetched. The inventor prefers that this minimum number of prefetched sectors be set at the larger of 16 sectors or the DAR size. Because each buffer segment detects its own DAR access pattern, each segment may be managed independently in the manner discussed. The COUNT threshold for detecting a SAP can be either fixed or a function of the number of blocks included in the latest DAR (the request size). The threshold should be reduced for larger DAR sizes and the inventor prefers a zero threshold for DARs larger than the 32-block segment size.

Clearly, other embodiments and modifications of this invention may occur readily to those of ordinary skill in the art in view of these teachings. Therefore, this invention is limited only by the following claims, which include all such embodiments and modifications when viewed in conjunction with the above specification and accompanying drawing.

I claim:

1. A method for adaptively operating a buffer memory by adjusting management of said buffer memory to optimize buffer memory hits in a data storage system having a primary storage means for storing a sequence of data blocks coupled to said buffer memory through a controller means for reading and storing in said buffer memory each of one or more said data blocks requested by a data access request (DAR) from a processor input/output (I/O) means wherein said DAR is the latest of an uninterruptedly consecutive DAR sequence having an access pattern, said controller means having means for prefetching a consecutive plurality of said data blocks stored in said primary storage means subsequently to said one or more requested data blocks and having means for storing said consecutive data block plurality in said buffer memory in either a block overwrite mode (BOM) or a circular overwrite mode (COM), said method comprising the steps of:

(a) detecting either a sequential said access pattern (SAP) or a nonsequential said access pattern (NAP) in said DAR sequence;

(b) switching said buffer memory storing means to said circular overwrite mode (COM) responsive to a detection of said SAP; and (c) switching said buffer memory storing means to said block overwrite mode (BOM) responsive to a detection of said NAP.

2. The method of claim 1 wherein said buffer memory includes a plurality of memory segments each independently operated such that an active said buffer memory segment is switched to said COM responsive to said SAP detection and is switched to said BOM responsive to said NAP detection.

3. The method of claim 2 wherein said detecting step (a) comprises the steps of:

(a.1) selecting a predetermined threshold for consecutive DARs;

(a.2) counting the number of said consecutive DARs received in said uninterruptedly consecutive DAR sequence; and (a.3) producing said SAP detection when said consecutive DAR number exceeds said predetermined threshold, otherwise producing said NAP detection.

4. The method of claim 3 wherein said selecting step (a.1) comprises the step of:

(a.1.1) changing said predetermined threshold responsive to the number of data blocks requested by said DAR.

5. A buffer memory controller coupled to a buffer memory in a data storage system having a primary storage means for storing a sequence of data blocks coupled to said buffer memory through said buffer memory controller and having means for accepting a plurality of data access requests (DARs) from a processor I/O controller, wherein said each DAR is the latest of an uninterruptedly consecutive DAR sequence having an access pattern, said buffer memory controller comprising:

fetching means coupled to said primary storage means and said buffer memory for reading and storing in said buffer memory each of one or more said data blocks requested by said each DAR;

prefetching means in said fetching means for reading and storing in said buffer memory a consecutive plurality of said data blocks stored in said primary storage means subsequently to said one or more data blocks requested by said each DAR, wherein said prefetching means stores said consecutive data block plurality in said buffer memory in either a block overwrite mode (BOM) or a circular overwrite mode (COM);

detecting means coupled to said fetching means for detecting either a sequential access pattern (SAP) or a non-sequential access pattern (NAP) in each said uninterruptedly consecutive DAR sequence; and switching means coupled to said prefetching means for switching said prefetching means storage mode to said COM responsive to said SAP detection and for switching said prefetching storing means to said BOM responsive to said NAP detection.

6. The buffer memory controller of claim 5 wherein said buffer memory comprises:

a plurality of memory segments each independently operated in said COM responsive to said SAP detection and in said BOM responsive to said NAP detection.

7. The buffer memory controller of claim 7 wherein said detecting means comprises:

selecting means for selecting a predetermined threshold for consecutive DARs;

counting means for counting the number of consecutive said DARs received in said each uninterruptedly consecutive DAR sequence; and comparing means coupled to said selecting means and said counting means for producing said SAP detection when said consecutive DAR number exceeds said predetermined threshold and for producing said NAP detection otherwise.

8. The buffer memory controller of claim 7 wherein said selecting means comprises:

means for changing said predetermined threshold responsive to the number of said data blocks requested by said each DAR.

9. The buffer memory controller of claim 8 wherein said prefetching means comprises:

minimum prefetching means for completing the prefetch of a minimum number of said data blocks before interruption.

10. A direct access storage device (DASD) having a rotating magnetic medium for storing a sequence of data blocks coupled to a buffer memory through a buffer memory controller comprising:

input means for accepting a plurality of DARs from a processor I/O controller, wherein each said DAR is the latest of an uninterruptedly consecutive DAR sequence having an access pattern;

fetching means coupled to said rotating magnetic medium and said buffer memory for reading and storing in said buffer memory each of one or more said data blocks requested by said each DAR;

prefetching means in said fetching means for reading and storing in said buffer memory a consecutive plurality of data blocks stored in said rotating magnetic medium subsequently to said one or more data blocks requested by said each DAR, wherein said prefetching means stores said consecutive data block plurality in said buffer memory in either a BOM or a COM;

detecting means coupled to said fetching means for detecting either a SAP or a NAP in said each uninterruptedly consecutive DAR sequence; and switching means coupled to said prefetching means for switching said prefetching storing means to said COM responsive to said SAP detection and for switching said prefetching storing means to said BOM responsive to said NAP detection.

11. The DASD of claim 10 wherein said buffer memory comprises:

a plurality of memory segments each independently operated in said COM responsive to said SAP detection and in said BOM responsive to said NAP detection.

12. The DASD of claim 11 wherein said detecting means comprises:

selecting means for selecting a predetermined threshold for consecutive DARs;

counting means for counting the number of consecutive said DARs received in said each uninterruptedly consecutive DAR sequence; and comparing means coupled to said selecting means and said counting means for producing said SAP detection when said consecutive DAR number exceeds said predetermined threshold and for producing said NAP detection otherwise.

13. The DASD of claim 12 wherein said selecting means comprises:

means for changing said predetermined threshold responsive to the number of said data blocks requested by said each DAR.

14. The DASD of claim 13 wherein said prefetching means comprises:

minimum prefetching means for completing the prefetch of a minimum number of said data blocks before interruption.

15. An optical data storage system having an optical storage medium for storing a sequence of data blocks coupled to a buffer memory through a buffer memory controller comprising:

input means for accepting a plurality of DARs from a processor I/O controller, wherein each said DAR is the latest of an uninterruptedly consecutive DAR sequence having an access pattern;

fetching means coupled to said optical storage medium and said buffer memory for reading and storing in said buffer memory each of said one or more said data blocks requested by said each DAR;

prefetching means in said fetching means for reading and storing in said buffer memory a consecutive plurality of data blocks stored in said optical storage medium subsequently to said one or more data blocks requested by said each DAR, wherein said prefetching means stores said consecutive data block plurality in said buffer memory in either a BOM or a COM;

detecting means coupled to said fetching means for detecting either a SAP or a NAP in said each uninterruptedly consecutive DAR sequence; and switching means coupled to said prefetching means for switching said prefetching storing means to said COM responsive to said SAP detection and for switching said prefetching storing means to said BOM responsive to said NAP detection.

16. The optical data storage system of claim 15 wherein said buffer memory comprises:

a plurality of memory segments each independently operated in said COM responsive to said SAP detection and in said BOM responsive to said NAP detection.

17. The optical data storage system of claim 16 wherein said detecting means comprises:

selecting means for selecting a predetermined threshold for consecutive DARs;

counting means for counting the number of consecutive said DARs received in said each uninterruptedly consecutive DAR sequence; and comparing means coupled to said selecting means and said counting means for producing said SAP detection when said consecutive DAR number exceeds said predetermined threshold and for producing said NAP detection otherwise.

18. The optical data storage system of claim 17 wherein said selecting means comprises:

means for changing said predetermined threshold responsive to the number of said data blocks requested by said each DAR.

19. The optical data storage system of claim 18 wherein said prefetching means comprises:

minimum prefetching means for completing the prefetch of a minimum number of said data blocks before interruption.

* * * * *